Figure 9:
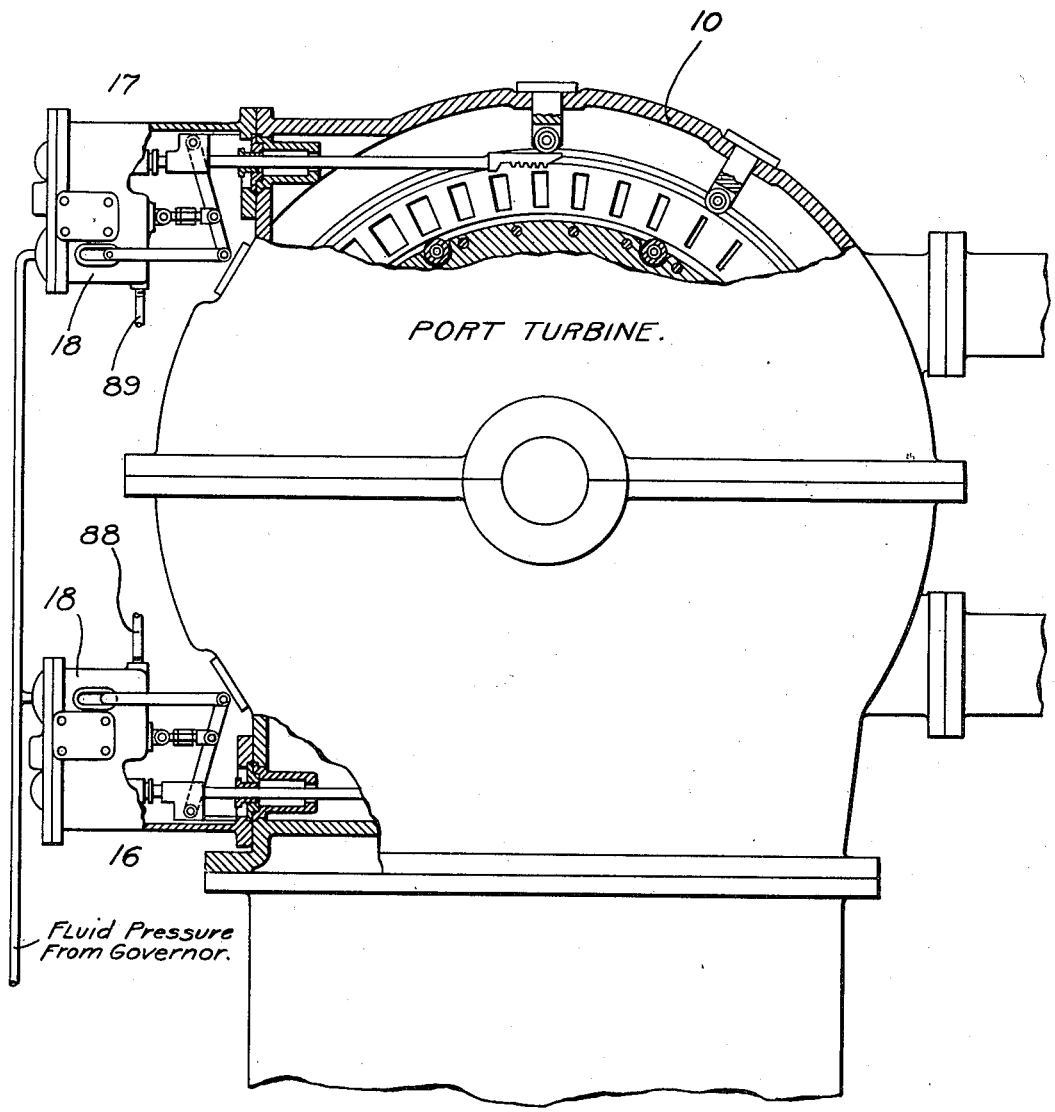

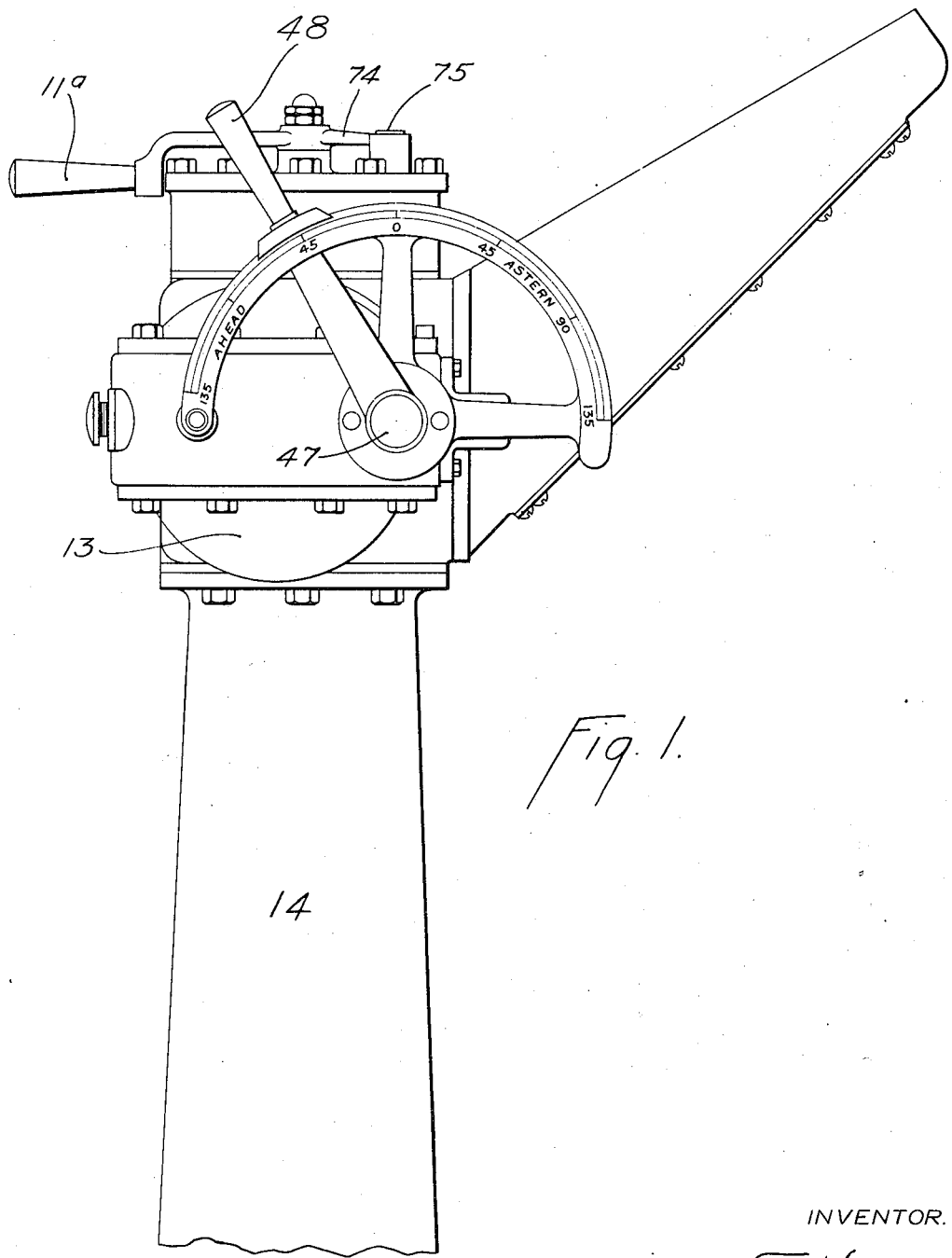

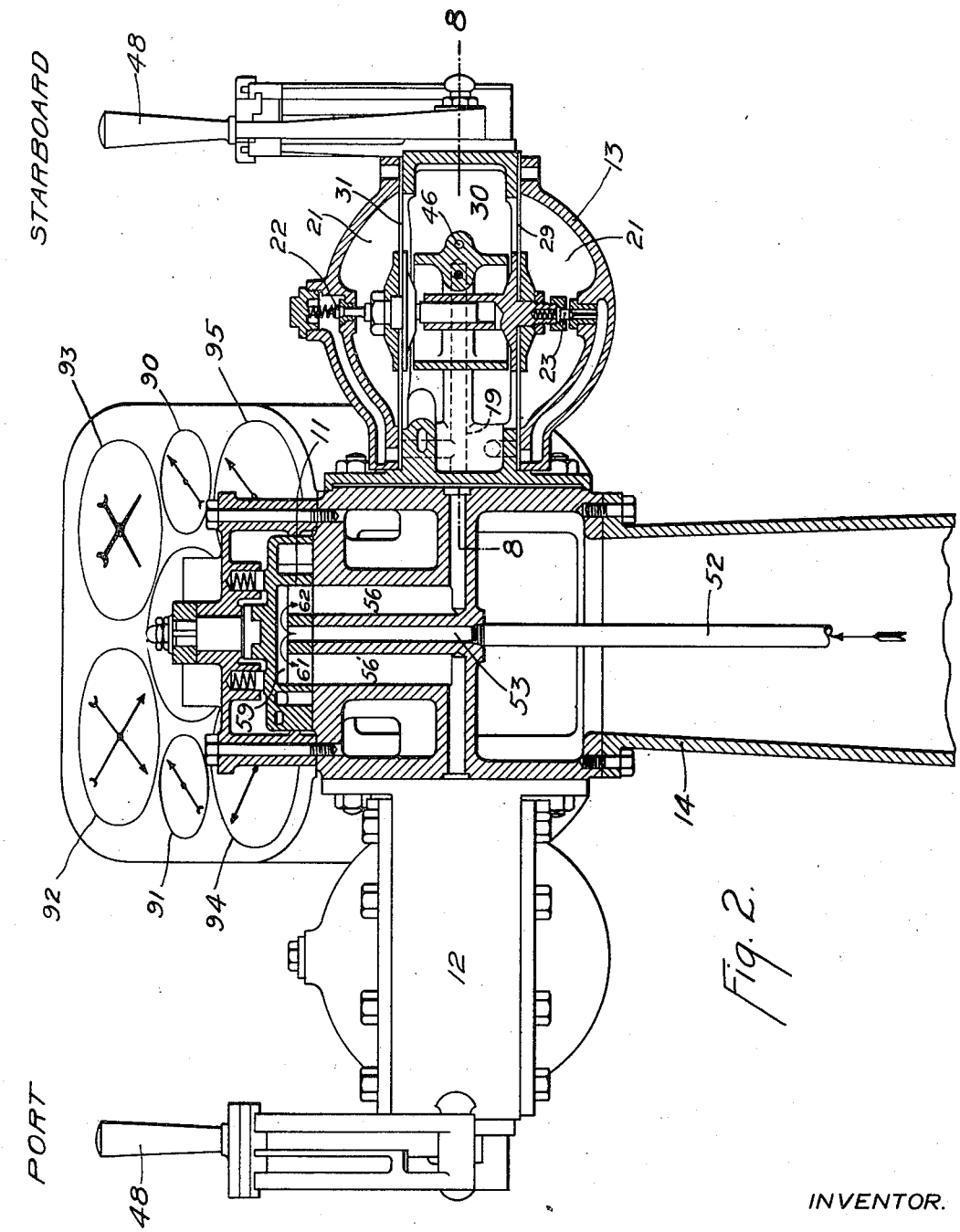

H. T. HERR.
BRIDGE CONTROL.
APPLICATION FILED MAY 19, 1914. RENEWED JAN. 13, 1916.
1,196,746.
Patented Aug. 29, 1916.
8 SHEETS—SHEET 3.
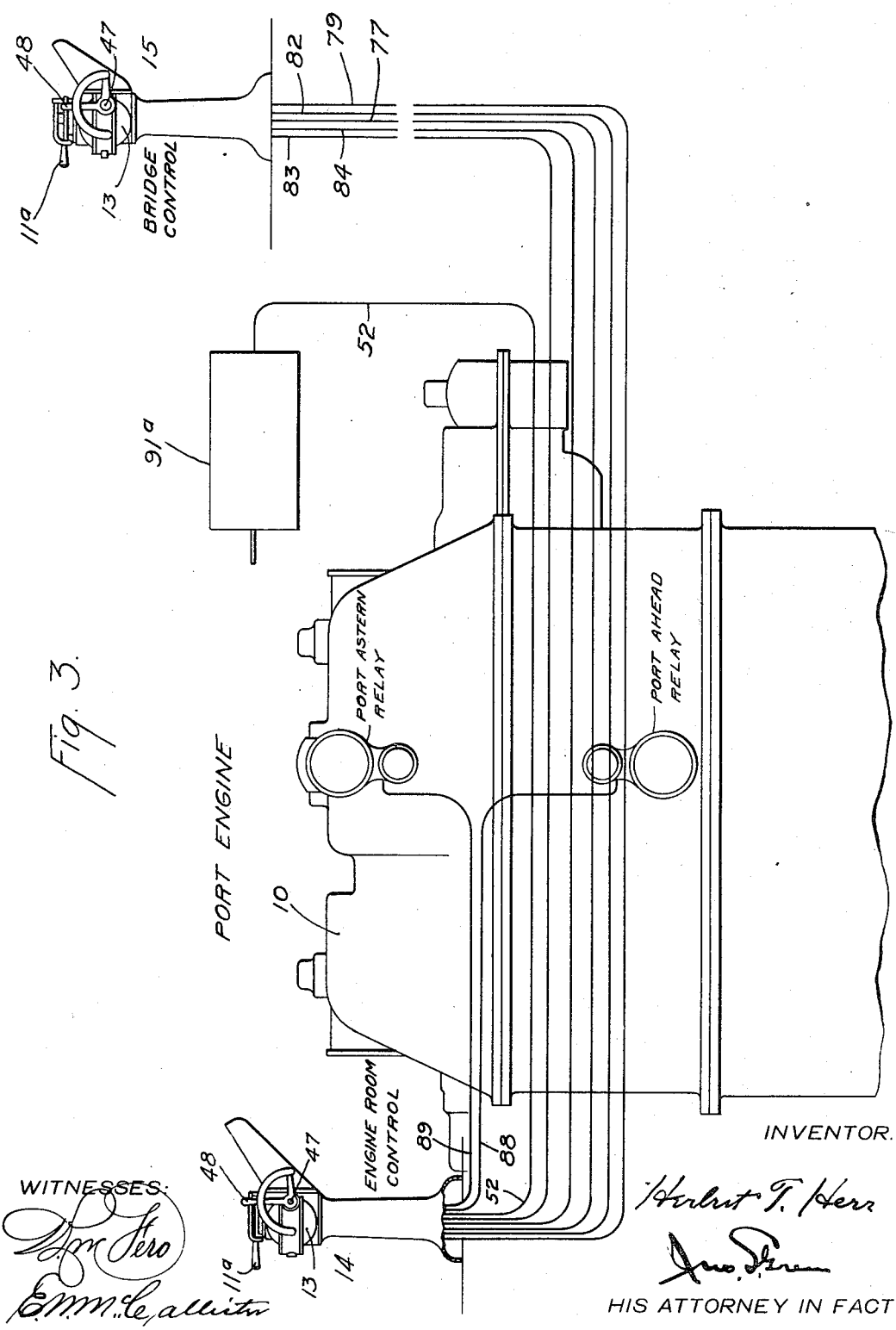

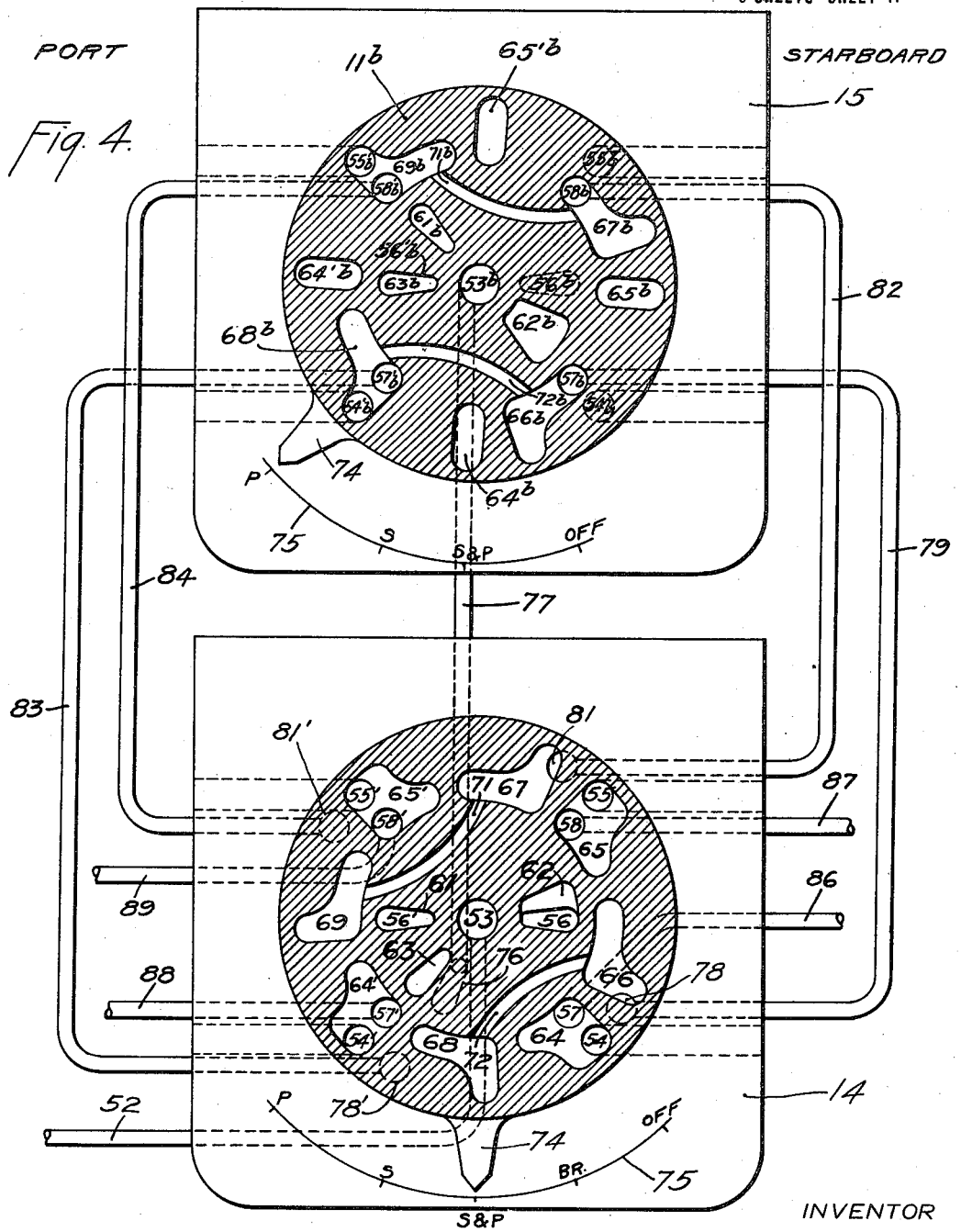

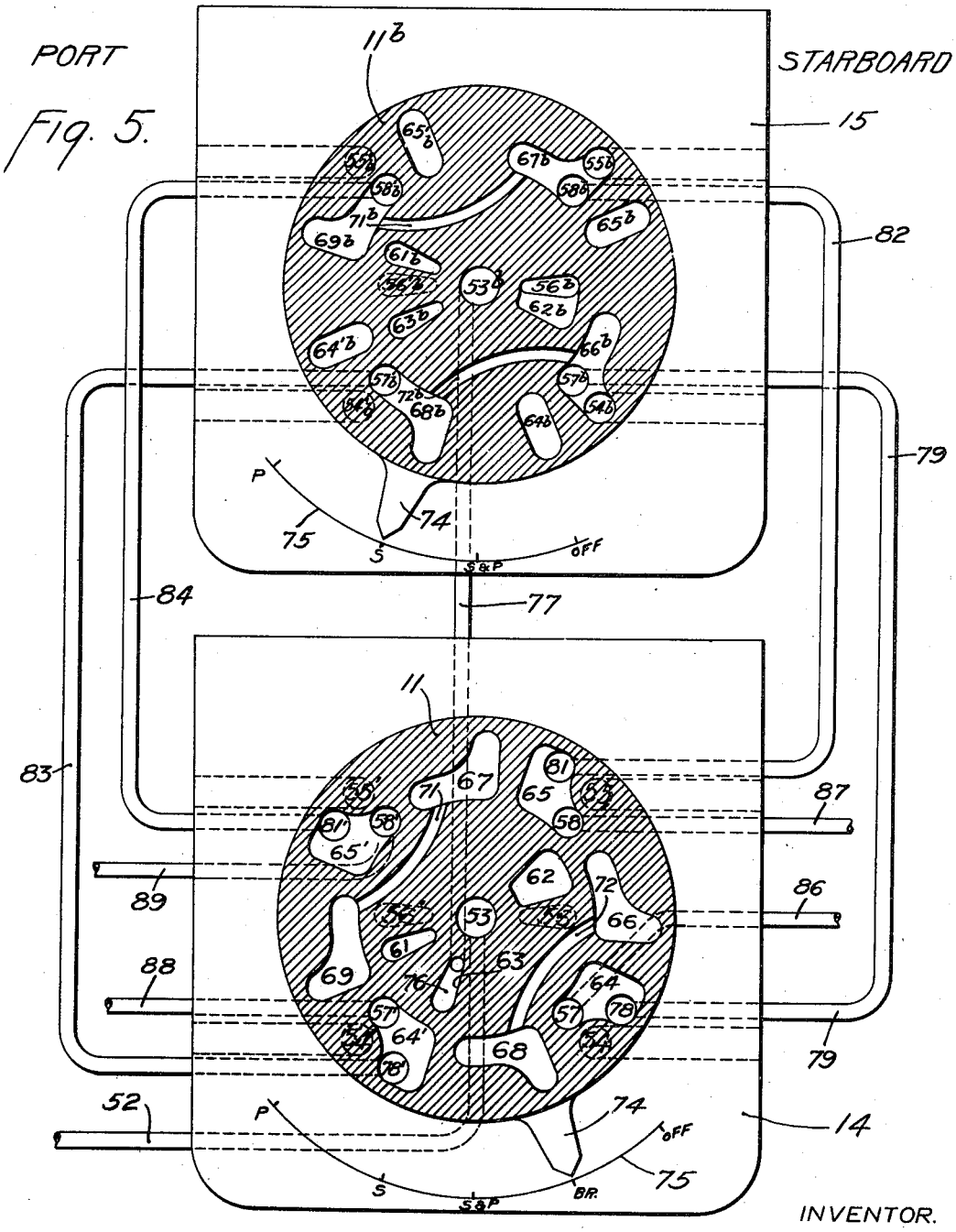

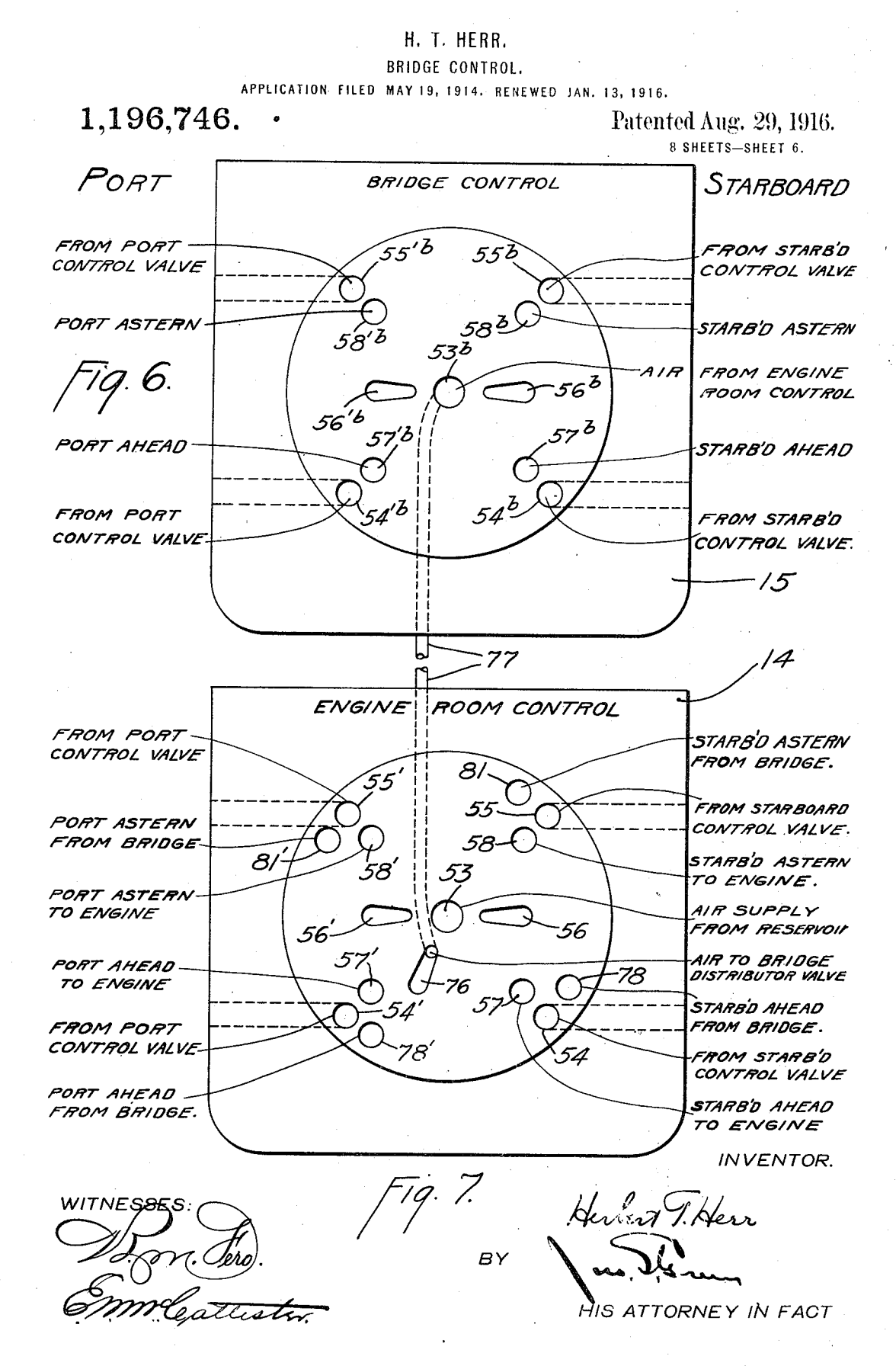

H. T. HERR.
BRIDGE CONTROL.
APPLICATION FILED MAY 19, 1914. RENEWED JAN. 13, 1916.

1,196,746.

Patented Aug. 29, 1916.
8 SHEETS—SHEET 6.

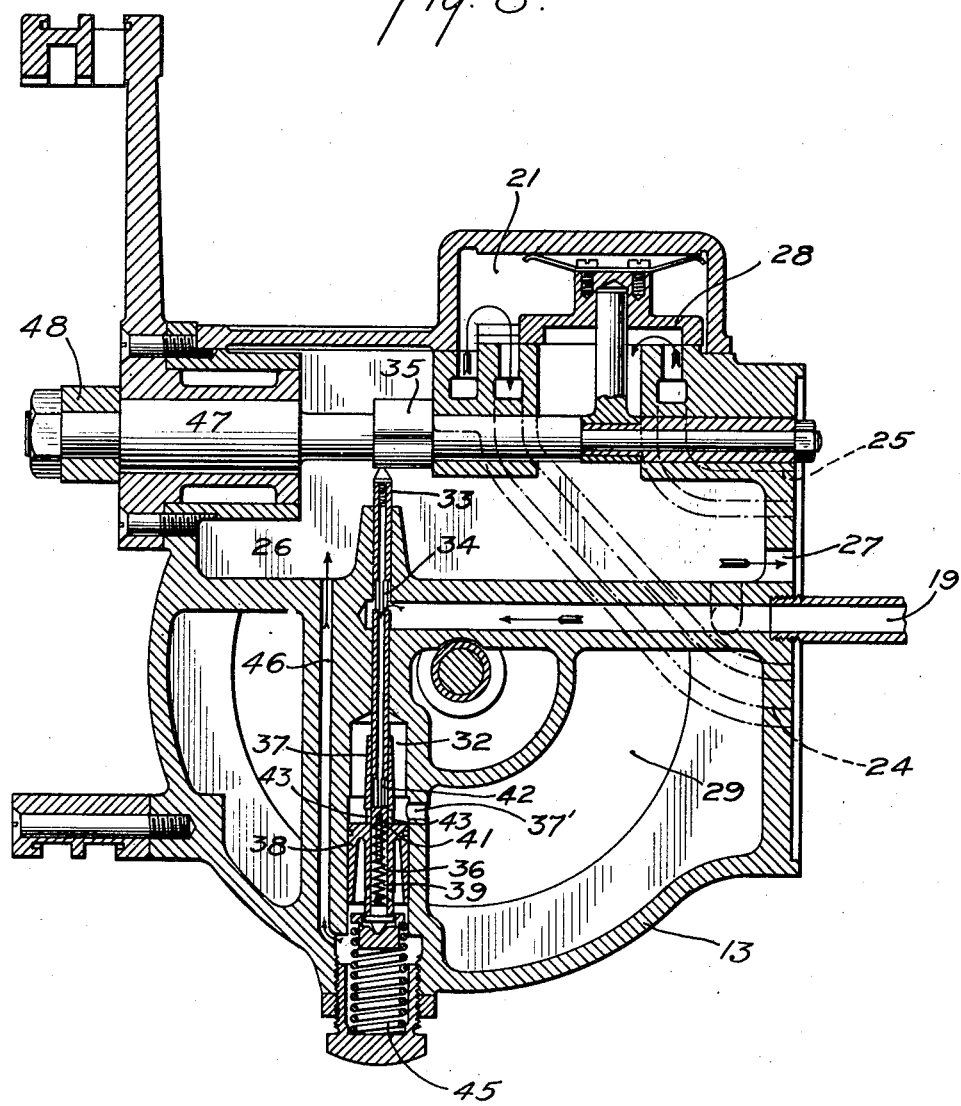

UNITED STATES PATENT OFFICE.

HERBERT T. HERR, OF PITTSBURGH, PENNSYLVANIA, ASSIGNOR TO THE WESTINGHOUSE MACHINE COMPANY, A CORPORATION OF PENNSYLVANIA.

BRIDGE CONTROL.

1,196,746. Specification of Letters Patent. Patented Aug. 29, 1916.

Application filed May 19, 1914, Serial No. 839,581. Renewed January 13, 1916. Serial No. 71,858.

*To all whom it may concern:*

Be it known that I, HERBERT T. HERR, a citizen of the United States, and a resident of Pittsburgh, in the county of Allegheny and State of Pennsylvania, have made a new and useful Invention in Bridge Control, of which the following is a specification.

This invention relates to engine control and has for an object to produce an improved controlling device, which is capable of controlling a number of engines either simultaneously or separately and independently.

A further object is to produce an improved system of control including one or more machines or engines and in which the control of one or all of the machines or engines may be shifted from one to another controlling device of the system.

A further object is to produce a system of control for machines or engines to be controlled in which the control of all the machines or engines included in the system may be transferred from one controlling device to another and in which each device on which the control is imposed may be adjusted to separately or simultaneously control the operation of a number of independent machines or engines.

A further object is to produce an improved system of control in which the control of apparatus included in the system may be transferred to or withdrawn from a so-called remote control device by the manipulation of a controlling device, which may be termed the master control device and which in itself is capable of separately or simultaneously controlling a number of different independent apparatus.

These and other objects, which will be made apparent throughout the further description of the invention, are attained by means of a controlling device and a system of control embodying the features herein described, and illustrated in the drawings accompanying and forming a part of this application.

The apparatus illustrated as an embodiment of my invention is adapted for use in controlling the propelling apparatus of a vessel and it is so arranged that all the engines, including in the propelling apparatus, may be either independently or simultaneously controlled from the engine room or from some remote station such as the bridge of the vessel.

The illustrated embodiment of my invention consists of a system of control including two elastic fluid or steam engines of the type commonly known as steam turbines, but it will be apparent that the invention is of such character and of such scope that it may be employed in controlling the operation of any number of engines and is not in any way limited to marine installations. It will also be apparent that, while I have illustrated the invention in conjunction with a steam turbine and have described it as being employed with a number of such engines, there is no desire to limit the invention to the control of such engines, or in fact to the control of fluid impelled engines exclusively since the invention is applicable to any type of engine whether included in the class ordinarily referred to as prime movers or is of that class including driven machines.

In the drawings accompanying and forming a part of this application Figure 1 is a fragmental side elevation of a controlling device embodying my invention. Fig. 2 is a fragmental view of the device shown in Fig. 1, portions being shown in front elevation and portions being shown in vertical section for convenience of illustration. Fig. 3 is a diagrammatic view of a system of control embodying my invention and illustrates the system as including a steam or elastic fluid turbine, the connections being such that either of the controlling devices illustrated may be employed in controlling the forward or the reversing operation of the turbine. While but one turbine is shown it is to be understood that the system illustrated and described includes two turbines and devices for either independently or simultaneously controlling them. Fig. 4 is a diagrammatic sectional view illustrating the arrangement of port-connecting passages formed in the distributing valves of two coöperating controlling devices, each of which embodies my invention, and each of which is included in the system embodying my invention. Fig. 5 is a view corresponding to Fig. 4 and shows the position of the distributing valve of one controlling device for transferring the control to the other controlling device included in the system. Fig. 6 is a diagrammatic view showing the valve seat of the distributing valve of a controlling device which is included in the illustrated system and is hereinafter referred to as the remote or bridge control device, since it is located at a distance from the apparatus controlled and, in the present embodiment, is described as being located on the bridge of a vessel equipped with a system of control. Fig. 7 is a corresponding view of a controlling device also included in the system and hereinafter termed the master or engine room controlling device, since it is not only illustrated as located in the engine room adjacent to the apparatus to be controlled, but in addition is capable of to some extent controlling the remote or bridge control device. Fig. 8 is a sectional view of a controlling valve which forms a detail of each of the controlling devices herein illustrated as embodiments of the invention. Fig. 9 is a diagrammatic view showing an end elevation, a turbine with a portion broken away for convenience of illustration, and discloses the ahead and astern admission valve mechanisms of the turbine and the admission valve operating motors which are included in the system of control illustrated.

The system of control herein illustrated as an embodiment of my invention, includes two separate controlling devices, 14 and 15, and two turbine engines 10. One engine only is illustrated since the controlling valves of both engines may be of similar construction and a showing of the second engine would be merely a duplication. The separate controlling devices 14 and 15 are so constructed and so arranged in the system that either may be employed in controlling both the engines included in the system, or one of the controlling devices may transfer the control to or withdraw it from the other device. As illustrated each controlling device includes a distributing valve 11 and two controlling valves 12 and 13, and each is so constructed that it may impose the control of one engine on each controlling valve or the control of both engines on either controlling valve.

The function of each controlling valve illustrated, is to control the pressure of actuating fluid delivered by it to the valve operating motor or motors of the engine admission valves, or in other words the amount of motion imparted to the admission valve controlling motor or motors with which it communicates. Each controlling valve is so arranged that it is primarily adapted to separately control one particular engine, but the distributing valve, with which it is associated is capable of causing it to simultaneously control all of the engines included in the control system, or of withdrawing the control from it. One of the functions of the distributing valve of each controlling device is therefore as above stated, to impose upon each controlling valve the control of a particular engine or to withdraw the control from all of the controlling valves but one, and to impose the control of all of the engines upon that one. An additional function of the distributing valve is that of shifting the control of all of the engines of the system from one controlling valve to the other, so that in case one controlling valve is damaged or rendered inoperative the control of the entire system can be immediately shifted to another valve without effecting the operation of the engines included in the system. In the present embodiment of the invention the distributing valve of the control device 14 is not only capable of performing the functions above enumerated but it is also capable of transferring the control from the control valves with which it is directly associated to the control device 15. I have previously stated that the device 14, having the functions last enumerated, is termed the master or engine room control, while the other device 15, to which the control may be shifted or from which it may be withdrawn, is termed the remote or bridge control. It will be made apparent throughout the further description of the invention that any number of remote control devices may be employed in connection with one master control device and that if desired one remote control device may be so arranged that it is capable of transferring the control to another remote control device, even though it itself is under the control of a master control device.

The two devices 14 and 15 are similar in most respects and both are provided with controlling valves 12 and 13, and a single distributing valve 11. For convenience of description one engine, 10 included in the illustrated system will be termed the port engine while the other engine, included in the system but not illustrated will be referred to as the starboard engine. Each engine is provided with a separate ahead admission valve mechanism 16 and a separate astern admission valve mechanism 17. As shown in Fig. 9, each admission valve mechanism includes a valve operating motor 18 which is included in the control system and is capable of actuating the admission valve associated with it to admit variable amounts of motive fluid to the engine so that the speed of the engine can be controlled while it is running in either the ahead or reverse direction. Each valve actuating motor is capable of being controlled by one or another of the control devices included in the system as will hereinafter be described.

The controlling valves 12 and 13 of each control device illustrated are similar in structure and they are also similar to the controlling valve illustrated in my application filed May 1st, 1913, for United States Patent, Serial No. 764,846, for which reasons but one controlling valve will be described. These valves are in themselves a valve mechanism to which fluid under pressure is delivered at any desired pressure and from which the fluid is delivered at a determined pressure dependent upon the relative positions of the parts of the valve.

The control valve 13 illustrated in section in Fig. 2 and in transverse section in Fig. 8 along the line 8—8 of Fig. 2, includes a pressure chamber 21 to which fluid under pressure is delivered through a passage 19 and branch passages connecting therewith, and from which fluid is delivered either through a passage 24 or a passage 25. The delivery of fluid to, and the degree of pressure contained within the chamber 21 is controlled by two pressure actuated automatic valves 22 and 23, the former being an inlet valve and adapted to control the delivery of fluid to the chamber 21 and the latter being a discharge valve and adapted to control communication between the chamber 21 and the atmosphere. As shown, the valve 23 is operatively connected to and actuated by a flexible diaphragm 29, which forms one lateral wall of a chamber 30 and the valve 22 is actuated by a flexible diaphragm 31, which forms the other lateral wall of the chamber 30. The exterior faces of the diaphragms are exposed to the pressure within the chamber 21, while the interior faces are exposed to the pressure within the chamber 30. The chamber 30 receives fluid from the passage 19 through a semi-automatic valve, generally designated in Fig. 8 by the numeral 32, which is adapted to be manually adjusted to maintain different determined pressures within the chamber, and which includes a tubular member 33 having peripheral ports 34, so arranged that they communicate with the passage 19 for all positions of the tubular member. The member 33 is capable of moving longitudinally in its casing and its projecting end is provided with a tip which is normally pressed against a cam 35 by means of a coiled spring 36. The other end of the member 33 slides within a hollow extension 37, formed on a pressure actuated plunger 38, which is subjected to the pressure within the chamber 30 through ports 37′ formed in the plunger casing. The plunger is also provided with a centrally located axially extending exhaust passage 39, which is adapted to be opened and closed by means of a plug valve 41, mounted on the adjacent end of the member 33. The member 33 is also provided with a second series of peripheral ports 42, which are adapted to deliver pressure from the passage 19 to the chamber 30 through ports 43, provided in the extension 37. These last mentioned ports are adapted to either open or close the ports 42 depending upon the relative positions of the member 33 and the plunger 38.

The plunger is normally forced toward the member 33 by means of a coiled spring 45 and the member 33 is adapted to be moved to different positions by the cam 35. Under such conditions the spring 45 tends to move the plunger to such a position relatively to the member 33 that the exhaust passage 39 of the plunger is closed by the plug valve 41 on the member 33 and the ports 42 are opened by the ports 43 in the extension and are placed in direct communication with the chamber 30. The pressure in the chamber however acts upon the plunger 38 and, opposing the pressure of the spring 45, tends to move the plunger so that the exhaust passage 39 is opened by the plug valve 41 and placed in communication with the chamber 30, and the ports 42 are closed by the extension so that they are cut off from communication with the chamber 30. In other words the fluid pressure within the chamber 30 tends to move the plunger to such a position that the pressure of the spring 45 is increased and it also tends to exhaust the chamber 30 by opening the passage 39 which communicates, through a passage 46, with an exhaust chamber 26 and consequently with the atmosphere through a port 27, with which the chamber 26 is provided.

The cam 35 is rigidly mounted on a shaft 47, which is capable of being turned to different positions by means of a hand lever 48 (Figs. 1 and 2) and the cam is so constructed that motion of the lever in either direction from its central position will depress the tubular member 33, or move it in opposition to the coil spring 36. The shaft 47 is also capable of being moved longitudinally through its bearings for the purpose of actuating a valve 28 and of thereby placing either the passage 24 or 25 in direct communication with the pressure chamber 21 or the exhaust chamber 26, as is fully described in the application to which I have referred.

The operation of the portion of the apparatus described in detail is as follows: When it is desired to increase the pressure within the chamber 30, for the purpose of increasing the actuating pressure on the valves 22 and 23 and consequently the pressure within the chamber 21, the cam 35 is turned by means of the lever 48 so that it moves the tubular member 33 farther into the extension 37 and causes the plug valve 41 to close the exhaust passage 39. This, as will be apparent from the drawings (Fig. 8) causes the ports 42 of the member 33 to move into register with the ports 43 in the extension and thereby into direct communication with the chamber 30, it being understood that the plug valve 41 is so positioned with relation to the ports 42 and 43 that the exhaust passage 39 is closed as the member 33 is depressed and then the ports 42 are opened. The closing of the passage 39 and the opening of the ports 42 cause the pressure to increase within the chamber 30 and consequently an increase of pressure on the flexible diaphragms 29 and 31, which actuate the valves 23 and 22 respectively. A movement of the diaphragm 31 in response to the increasing pressure within the chamber 30, opens or increases the opening of the valve 22 and causes fluid under pressure to be delivered through suitable connecting passages to the pressure chamber 21, while a movement of the diaphragm 29 in response to increasing pressure in the chamber 30 closes the valve 23 or throttles to a greater extent the passage of fluid through it to the exhaust. This causes an increase in pressure within the chamber 21 and on the exterior faces of the diaphragms. The increasing pressure within the chamber 30 also causes the plunger 38 to move in opposition to the pressure of the spring 45 so that it will eventually close the ports 42 and open the passage 39 by moving away from the member 33. It will be apparent that the plunger will move in that direction until a balance is established between the fluid pressure exerted on the plunger and the opposing spring pressure and that a definite fluid pressure will be maintained in the chamber for each position of the member 33 since the plunger will continue to move and to open or close the ports 42 and exhaust passage 39 until the opposing pressures acting on it counterbalance each other. Consequently any desired pressure may be maintained in the chamber 30 merely by moving the tubular member 33 to a different position and the actuating lever of the cam may be provided with a scale graduated either in pounds for indicating the pressure within the chamber 30 or in any other suitable units, such as R. P. M. which in the particular apparatus illustrated may refer to the speed of the turbine or turbines controlled, since the speed will vary in proportion with the variations in pressure within the chamber 30. The diaphragms 29 and 31 will be forced outwardly by the preponderating pressure within the chamber 30 until the pressure within the chamber 21 and consequently on the exterior faces of the diaphragms is equal to the pressure within the chamber 30, at which time the diaphragms will assume their normal positions and both the valves 22 and 23 will be closed. In addition to this the pressure in the chamber 21 will be maintained equal to that in the chamber 30 since a variation of pressure either above or below that maintained in the chamber 30, will cause a corresponding movement of the diaphragms and will actuate the valves 22 and 23 to increase or diminish the pressure in the chamber 21.

When it is desired to decrease the pressure within the chamber 30 and consequently to decrease the degree of fluid pressure in the pressure chamber 21, the cam 35 is turned to such position that it permits the tubular member 33 to be forced outwardly, by the spring 36, with relation to its guide and also to the extension 37. This movement of the member 33 withdraws the plug valve from the passage 39 and closes the ports 42 thereby cutting off communication between the chamber 30 and the passage 19 and placing the chamber in direct communication with the atmosphere through the port 27. This causes the pressure in the chamber 30 to decrease and consequently permits the external fluid pressure on the diaphragms to actuate the valves 22 and 23, the former being moved to the closed position and the latter to the open position. The decreasing pressure within the chamber 30 reduces the fluid pressure on the plunger 38 and consequently the plunger will move in response to the pressure of the spring 45 until a new position of equilibrium is established; that is until the passage 39 is again closed by the plug valve and the pressure within the chamber 30 and acting on the plunger again counterbalances the opposing pressure of the spring 45. It will also be apparent that the valve 23 will remain open and the valve 22 closed until the fluid pressure on the outside of the diaphragms equals the fluid pressure within the chamber 30 at which time the diaphragms will again assume their normal or central positions and the valves 22 and 23 will both be closed.

In the present embodiment of my invention each controlling valve receives fluid under pressure from, and returns the fluid so received back to the distributing valve 11 with which it is associated. Each control device receives fluid under pressure, from any suitable source, through a pipe 52, which communicates with a port 53 formed in a valve seat provided on the device for the distributing valve 11 (see Figs. 2, 6 and 7). As previously stated, each control device is provided with two controlling valves 12 and 13 and for convenience of description they may respectively be termed the port controlling valve and the starboard controlling valve.

Referring now particularly to the master control device and to Fig. 7:—the passages 24 and 25 of the starboard controlling valve communicating respectively with the ports 54 and 55 of the valve seat, while the corresponding ports of the port control valve communicate with the ports 54′ and 55′ respectively. The passage 19 of the starboard controlling valve communicates with the port 56 formed in the valve seat and the corresponding passage of the port controlling valve communicates with a similar port 56'. The valve seat is also provided with ports 57 and 58, which respectively communicate with the actuating motors of the ahead and astern inlet valves of the starboard engine and ports 57' and 58' are also provided which communicate with the corresponding valve mechanisms of the port engine.

The distributing valve 11 is adapted to be moved to different positions for the purpose of placing certain of the ports above referred to in communication with each other and for thereby rendering, one or the other or both of the controlling valves 12 and 13 effective in controlling the operation of one engine or both engines included in the system. As illustrated in Fig. 2, the distributing valve is provided with a central chamber 59 which communicates with ports 61, 62 and 63 formed in the seat engaging face of the valve. (See lower portion of Figs. 4 and 5). This chamber is in continual communication with the port 53 and the ports 61 and 62 are adapted to be moved into register with the ports 56' and 56 respectively and to thereby place the passage 19 of each of the controlling valves 12 and 13 in direct communication with the passage 53 and to deliver fluid under pressure to them. The valve 11 is also provided on its seat engaging surface with depressions or pockets 64, 65, 64' and 65' which, when the distributing valve is located in the central or intermediate position shown in the lower portion of Fig. 4, are respectively adapted to place the port 54 in communication with the port 57, the port 55 in communication with the port 58, the port 54' with the port 57', and the port 55' in communication with the port 58', so that the passage 24 of each of the controlling valves 12 and 13 communicate with the actuating motors of the ahead admission valves of the port and the starboard engines respectively and the passages 25 of both of the valves 12 and 13 communicate with the actuating motors of the astern admission valves of the port and starboard engines respectively. This position of the distributer valve 11 may be termed the starboard and port control position, since it renders each controlling valve associated with it capable of independently controlling a particular engine; that is the valve 13 is capable of being employed in controlling the starboard engine and the valve 12 in controlling the port engine as set forth in the application to which I have referred.

When it is desired to shift the control from one of the controlling valves, as for example, the port valve 12, and to impose it on the other, the distributer valve 11 is shifted from the central or intermediate position shown in Fig. 4 to a position corresponding to that of the upper valve shown in Fig. 5. This position of valve 11 blanks or closes the ports 54', 55' and 56' but moves a pocket or depression 66, formed in the seat engaging face of the valve 11, into communication with the ports 54 and 57, a similar depression 67 into communication with the ports 55 and 58, a depression 68 into communication with the port 57' and a similar depression 69 into communication with the port 58'. The pockets 67 and 69 communicate with each other through an ample fluid delivery passage as diagrammatically shown at 71 in Figs. 4 and 5 and the pockets 66 and 68 also communicate with each other through a similar delivery passage, as indicated at 72 in Figs. 4 and 5. Under such conditions, fluid under pressure is delivered from the passage 24 of the starboard controlling valve through the port 54 to both the ports 57 and 57' and consequently to the ahead admission valve operating motors of both of the engines, included in the system. The passage 25 of the starboard controlling valve 13 is also placed in communication with the ports 58 and 58' by being placed in communication with port 55 and it is thereby placed in communication with the astern admission valve actuating motors. Under such conditions, the starboard valve 13 may be employed in controlling the operation of both of the engines while running ahead or astern, since it is capable of delivering actuating fluid to the valve actuating motors of both of the engines. When the distributing valve 11 is in the position just described, the ports 61 and 63 which communicate with the central chamber 59 are blanked or closed but the port 62 is of such size that it continues to register with the port 56, and consequently delivers fluid under pressure to the passage 19 of the starboard valve 13.

When the starboard controlling valve 13, is in the position indicated in Fig. 8, the chamber 21 is in communication with the passage 24, and consequently fluid pressure is delivered to the ahead admission valve actuating motors of both engines, and the astern admission valve actuating motors of both engines are placed in communication with the atmosphere through the passage 25, the D. valve 28, the chamber 26 and port 27, as shown in Fig. 8. When the valve 28 is shifted by a longitudinal motion of the shaft 47, the passage 25 is placed in communication with chamber 21 and fluid under pressure is delivered to the astern valve actuating motors of both engines, while the ahead valve actuating motors are placed in communication with the exhaust through the passage 24, and chamber 26.

When it is desired to place the control of both the engines included in the system on the port valve 12 of the master control device, the distributing valve 11 is shifted to a position corresponding to that illustrated at the top of Fig. 4 in which the pockets 68 and 69 respectively establish communication between the ports 54' and 57' and the ports 55' and 58' and the pockets 66 and 67 are moved to such positions that they register with the respective ports 57 and 58. In this position of the valve 11 the port 63, which communicates with the central chamber 59 of the valve 11, registers with the port 56', thereby delivering fluid under pressure from the pipe 52 to the passage 19 of the port control valve 12. The fluid so delivered is capable of being returned to the valve 11 from the passage 24 of the valve 12 through the port 54' to both of the ports 57' and 57 and consequently to the valve actuating motors of the ahead admission valves of both the engines included in the system. The passage 25 of the controlling valve 12 is also capable of delivering fluid through the port 55' to both the ports 58' and 58. This renders the port controlling valve 12 capable of simultaneously controlling the operation of both the engines included in the system.

In Figs. 4 and 5 of the drawings I have diagrammatically illustrated the distributing valves 11 and $11^b$ of both the controlling devices 14 and 15 and have shown each valve provided with an indicator 74 which is adapted to move along a marked scale or segment 75, and to indicate the position of the distributing valve and also upon which of the controlling valves the control is imposed. When the distributing valve 11 of the master control device is moved to the position indicated in the lower portion of Fig. 5, in which the indicating finger 74 points to the letters "B. R." on the scale 75, the control of all the engines included in the system is shifted from the master control device 14 to the bridge control device 15. With the distributing valve of the control device 14 in this position the ports 56 and 56' are blanked or closed so that fluid under pressure cannot be delivered to the passage 19 of the controlling valves 12 and 13 forming a part of the master control device, but the port 63, of the valve 11, is moved into communication with a port 76 formed in the valve seat (see Fig. 7) and communicating through a pipe or passage 77 with a port $53^b$ of the valve seat forming a part of the control device 15, (see Figs. 5 and 6). The pocket 64 is also moved to such a position that it places the port 57 in communication with a port 78 which communicates through a pipe or passage 79 with a port $57^b$ formed in the valve seat of the device 15. The pocket 65 likewise places the port 58 in communication with a port 81 formed in the valve seat of the device 14 and which communicates through a pipe or passage 82 with a port $58^b$ formed in the valve seat of the device 15. The pocket 64' is in such a position that it establishes communication between the port 57' and a port 78' formed in the valve seat of the device 14 and which communicates through a pipe 83 with a port $57'^b$ of the valve seat of the device 15. The pocket 65' also establishes communication between the port 58' and a port 81' formed in the valve seat of the device 14 and which communicates through a pipe or passage 84 with a port $58'^b$ formed in the valve seat of the device 15. The ports 54, 55, 54' and 55' of the device 14 are all blanked or closed by the distributing valve and consequently direct communication between the passages 24 and 25 of the controlling valves 12 and 13, of the master control device, and the admission valve actuating motors of the engines, included in the system, is cut off.

The valve seat of the controlling device 15 is provided with ports $54^b$ and $55^b$ which respectively communicate with the passages 24 and 25 of the starboard controlling valve 13 forming a part of the device 15. It is also provided with ports $54'^b$ and $55'^b$ which communicate with the corresponding passages of the port controlling valve 12 of the device 15. The distributing valve $11^b$ of the device 15 is similar in many respects to the valve 11 of the device 14 and is provided with pockets or depressions $64^b$, $65^b$, $64'^b$, $65'^b$, $66^b$, $67^b$, $68^b$ and $69^b$ which correspond to the similarly located pockets of the valve 11 included in the device 14. The central chamber 59 of the valve $11^b$ included in the device 15 is also provided with passages $61^b$, $62^b$ and $63^b$, which correspond in function to the similarly located ports of the distributing valve 11 in the device 14. The pockets $66^b$ and $68^b$ are placed in communication with each other by passage indicated at $72^b$ and the pockets $67^b$ and $69^b$ are placed in communication with each other by means of the passage as indicated at $71^b$.

With the two valves 11 and $11^b$ turned to the positions indicated in Fig. 5, the control of both the engines of the system is not only shifted from the master control device 14 to the bridge control device 15 but is also imposed upon the starboard controlling valve 13 of the bridge control device. Under such conditions fluid under pressure from the source of supply is delivered from the pipe 52 through the port 53 to the central chamber 59 of the valve 11. From this chamber it passes through the port 63, of the valve 11, the port 76 in the valve seat of device 14 and the pipe 77 to the central chamber 59 of the distributing valve $11^b$ forming a part of the bridge control device 15. The fluid then passes through the port 62$^b$ of the valve 11$^b$, a port 56$^b$, formed in the valve seat of the device 15, and through a communicating passage to the passage 19 of the starboard controlling valve 13 forming a part of the device 15. Under such conditions the controlling valve 13 is capable of delivering fluid under pressure back through its passage 24 to the port 54$^b$ or port 55$^b$ and consequently of delivering fluid under pressure through the port 57$^b$ and the pipe 79 to the port 78, or through its passage 25 back to the port 58$^b$ to the pipe 82 and to the port 81. The port 78, as has been said, is placed in communication with the port 57 of the control device 14 by the pocket 64 and consequently communicates through a pipe or passage 86 with the ahead admission valve operating motor of the starboard engine. The port 81 communicates, through the pocket 65, with the port 58 and consequently communicates with the operating motor of the astern admission valve of the starboard engine through a passage 87.

As has been previously described in connection with Fig. 8, the D valve 28, of the controlling valve, controls the delivery of fluid from the chamber 21 to each of the passages 24 and 25, and it is so arranged that it simultaneously places one of the passages in communication with the exhaust, and the other in communication with the chamber 21. Hence the valve operating motors of the astern admission valves of both turbines will be connected to the exhaust while the ahead admission valve operating motors are receiving fluid from chamber 21 and are effective in holding the ahead admission valves open, and vice versa the ahead admission valve motors are connected to the exhaust while the astern admission valve operating motors are receiving fluid under pressure from the chamber 21.

Inasmuch as the pockets 66$^b$ and 68$^b$ communicate with each other through the passage 72$^b$, fluid under pressure returned to the distributing valve of the device 15 through the port 54$^b$ is capable of being delivered to the port 57'$^b$ and through the pipe 83 to the port 78' of the device 14. From this port the fluid may be delivered through the port 57' and a pipe or passage 88 to the valve actuating motor of the ahead valve of the port engine. The pockets 67$^b$ and 69$^b$ are also connected together by the passage 71$^b$ and consequently fluid under pressure entering the pocket 67$^b$ through the port 55$^b$ is capable of being delivered through the port 58'$^b$ and pipe 84 to the port 81' of the valve seat forming a part of the master admission valve. From this port the fluid is delivered through the port 58' and a pipe or passage 89 to the valve operating motor of the astern admission valve of the port engine. Consequently it will be seen that the arrangement of the distributing valves 11 and 11$^b$, illustrated in Fig. 5, renders the starboard controlling valve of the bridge controlling device capable of simultaneously controlling both the engines in the system.

When the distributing valve 11$^b$ of the bridge control device 15 is turned to the position shown in Fig. 4, the distributing valve 11 of the master control remaining at the position shown in Fig. 5, the control of both the engines in the system is imposed upon the port controlling valve 12 of the device 15 and the fluid under pressure will be delivered as previously described from the master controlling device 14 to the distributing valve of the bridge controlling device, from which it is delivered to the passage 19 of the port controlling valve through the port 63$^b$ and the port 56'$^b$. From this valve the fluid pressure may be delivered either through the passages 24 or 25 of the port control valve back to the distributing valve 11$^b$ and then back to the distributing valve 11 of the device 14, from which it may be delivered to one or the other of the valve actuating motors of both the engines.

When the distributing valve 11$^b$ of the bridge control device is turned to a position corresponding to that in which the distributing valve 11 of the master control device is illustrated in Fig. 4, the control of the starboard engine will be imposed upon the starboard controlling valve of the device 15 and the control of the port engine will be imposed upon the port controlling valve of that device. To accomplish this the distributing valve of the master device 14 must of course be turned to the bridge control position, as indicated in Fig. 5, so that the admission ports 56 and 56' of that valve are blanked or closed and the admission port 76 is placed in communication with the fluid delivery pipe 52 and fluid under pressure is delivered to the bridge control device 15. With both the distributing valves in the positions described fluid under pressure will be delivered from the port 63 through the port 76 and the passage 77 to the central chamber 59 of the distribution valve 11$^b$. From this chamber the fluid will be delivered through the ports 62$^b$ and 61$^b$ to the port 56$^b$ and the port 56'$^b$ of the valve seat of the device 15. As has been described, the port 56$^b$ communicates with the passage 19 of the starboard valve 13 of the device 15 and the port 56'$^b$ communicates with the passage 19 of the port valve 12 of that device; consequently each controlling valve of the device 15 receives fluid under pressure and is therefore capable of returning fluid under pressure back to the distributing valve 11$^b$ with which it is associated. The fluid under pressure from the valve 13 is capable of being returned through the ports 54$^b$ and 55$^b$ and consequently of being delivered to the port 57 or the port 58 on the master distributing device, the former of which communicates through the pipe 86 with the actuating motor of the ahead admission valve of the starboard engine, while the latter communicates through the pipe 87 with the actuating motor of the astern admission valve of that engine. The port controlling valve 12 of the device 15 is also capable of delivering fluid under pressure to either of the ports 54'$^b$ or 55'$^b$ of the valve 11$^b$ and, inasmuch as these ports are respectively placed in communication with the ports 57'$^b$ and 58'$^b$ by the pockets 64'$^b$ and 65'$^b$, fluid under pressure may be delivered either to the actuating motor of the port ahead admission valve or of the port astern admission valve.

Each of the distributing valves 11 and 11$^b$ is capable of being turned to the off position in which its indicating finger 74 points to the word "off" on the scale 75 and in which all the admission ports, provided in the valve seat and adapted to be placed in communication with the central chamber 59, are blanked or closed. With either valve in this position its associated controlling valves 12 and 13 are rendered inoperative, and in the case of the valve 11 of the master control device 14 fluid is also cut off from the bridge control device, and the entire system is rendered inoperative as a controlling agent of the admission valves of the engines included in the system.

It will be apparent that two or more bridge control devices may be associated with one master control device and that with a bridge control device similar in all respects to the master control device, additional remote controlling devices could be employed which would bear the same relation to the device 15 as that device bears to the device 14. It will also be apparent that any number of engines or devices to be controlled may be included in the system since the passages 86, 87, 88 and 89 may be provided with one or more branches, or additional ports may be provided in the valve seats of the control devices for independently controlling the additional engines.

In the control device illustrated I have provided a number of different gages which are adapted to indicate to the operator the condition of the different apparatus under his control. The gage 90 is adapted to be connected with the steam supply of both the engines 10 and to indicate the available steam pressure. The gage 91 is adapted to be connected to the air reservoir 91$^a$ (Fig. 3) or to the source of actuating fluid supply for the controlling system and consequently it is adapted to indicate the available fluid pressure in the system. The gage 92 is a duplex gage and is provided with two indicating hands, one of which is adapted to indicate the pressure in the pipe line 88 and the other in the pipe line 89. With this arrangement the position of the valve operating motors communicating with the pipes 88 and 89 will be indicated by the hands of the gage and if desired the scale of the gage may be calibrated in R. P. M. instead of units of pressure. The gage 93 corresponds in all respects to the gage just described except that it is adapted to indicate the pressure in the pipes 86 and 87. With this arrangement the setting of each of the controlling valves may be instantly ascertained by a reference to the gages 92 and 93. The gages 94 and 95 are adapted to be connected to dynamometers operating in connection with the port and starboard engines respectively and consequently indicate the power developed by each of the engines.

In accordance with the patent statutes I have illustrated and described what I now consider the preferred embodiment of my invention, but I desire it to be understood that various changes, substitutions, modifications, additions and omissions may be made in the apparatus illustrated without departing from the spirit and scope of the invention as set forth by the appended claims.

I claim—

1. A control system, comprising a plurality of engines to be controlled, a separate controlling valve for each engine, and means common to the controlling valves for rendering one or all of the valves effective or ineffective as a controlling agent.

2. A control system, comprising a plurality of engines to be controlled, a separate controlling valve for each engine, and means common to all the valves, for rendering one or all the valves effective or ineffective in controlling separate engines or for shifting the control of all the engines to one of said valves.

3. A control system, comprising at least two engines to be controlled, a separate controlling device for controlling the operation of each engine, and means common to said device for shifting the control of all the engines to one or another of the devices.

4. A control mechanism comprising a plurality of controlling devices, and means common to said devices for shifting the control from one to another of said devices, and for rendering all of said devices effective or ineffective as controlling agents.

5. A controlling device comprising a plurality of controlling valves, each adapted to receive fluid from a source of fluid pressure and to deliver fluid at a determined pressure dependent on the relative positions of the parts constituting the valve, and a distributing valve for receiving fluid from one or all of said control valves and for delivering the fluid received to one or more engines to be controlled.

6. A control device comprising a plurality of controlling valves, each adapted to receive fluid from a source of fluid pressure and to deliver fluid at a determined pressure depending on the adjustment of the valve, and a distributing valve associated with all the valves for delivering fluid from said valves to apparatus to be controlled.

7. A control device comprising a plurality of controlling valves, each adapted to receive fluid from a source of fluid pressure supply and to deliver the fluid at a determined pressure dependent on the adjustment of the valve, and a distributing valve for receiving fluid from said source of supply and for delivering it to one or another or all of said controlling valves, and to receive and direct the fluid delivered by said controlling valves.

8. A control device comprising a plurality of controlling valves for receiving fluid from a source of fluid pressure, and for delivering fluid at a determined pressure dependent upon the adjustment of the valve, a distributing valve for delivering fluid from said source to one or all of said controlling valves, and for cutting off the supply of fluid to all of said controlling valves and having delivery ports to which fluid from said controlling valves is delivered.

9. A controlling device comprising a plurality of supply valves, each adapted to receive fluid from and to deliver fluid so received, at a determined pressure dependent upon the adjustment of the valve, back to the distributing valve, and a distributing valve communicating with a source of fluid under pressure, having ports communicating with the receiving passages of each of said controlling valves, and ports communicating with the delivery passages of each of said controlling valves and with apparatus to be controlled, and means for connecting said ports with the source of fluid supply and with the apparatus to be controlled by said controlling valves.

10. In a control device a plurality of controlling valves, each adapted to receive fluid from a source of fluid pressure, and to deliver fluid at a determined pressure dependent upon the adjustment of the valve, and a distributing valve comprising a valve having ports communicating with the admission and delivery passages of said valves and with apparatus to be controlled by said control valves, and a valve proper having passages for connecting the admission passages of said control valves with the source of fluid pressure and the delivery passages of said control valves with the apparatus to be controlled.

11. A controlling device comprising two controlling valves, each adapted to receive fluid from a source of pressure and to regulate the pressure delivered to apparatus to be controlled, in combination with a distributing valve for delivering fluid under pressure to either or both of said valves, and for placing either or both of said controlling valves in communication with apparatus to be controlled or for cutting off communication between each or both of said controlling valves and the apparatus to be controlled.

12. In a control system, apparatus to be controlled, a plurality of control mechanisms included in said system and adapted to control the operation of said apparatus, one of said mechanisms being adapted to shift the control of said apparatus to or to withdraw it from another of said mechanisms.

13. In a control system, a plurality of engines to be controlled, a control mechanism for simultaneously or independently controlling said engines, and a master control mechanism for simultaneously or independently controlling said engines, and for shifting the control of said engines to or withdrawing it from said first mentioned control mechanism.

14. In a control system, a plurality of engines to be controlled, a control mechanism included in said system, and comprising a plurality of control devices, and means common to said devices for imposing the control of one engine included in the system upon each device, or for imposing the control of all the engines included in the system on one or another of said devices.

15. In a control system, a plurality of engines to be controlled, two controlling mechanisms included in said system, each including a plurality of control devices, and means associated therewith for imposing the control of one engine of said system upon each device, or for imposing the control of all the engines of the system upon one or another of said devices, the means of one of said mechanisms being capable of shifting the control of all of said engines to or withdrawing it from the other mechanism.

16. A system of control including fluid actuated valve operating motors for the admission valves of an engine to be controlled, a controlling valve adapted to be placed in communication with each motor for controlling the degree of actuating pressure delivered thereto, and a gage communicating with the fluid admission port of each motor for indicating the degree of pressure delivered to the motor.

17. A system of control including a plurality of fluid actuated valve actuating motors for the admission valves of engines to be controlled, a control device included in said system and comprising controlling valves, each adapted to receive fluid under pressure and to deliver fluid so received to one or another of said motors at a determined pressure dependent on the adjustment of the controlling valve, a distributing valve for receiving fluid under pressure from a source of supply, and for placing each of said controlling valves in communication with the source of supply and with one or another of said controlling valves, and a separate gage communicating with the admission port of each motor for indicating the degree of pressure delivered thereto.

18. A control system, comprising two engines to be controlled, a separate controlling device for controlling the operation of each engine, and means common to both said devices for rendering each of the devices operative or inoperative in controlling an engine of the system and for shifting the control of both engines on to one or the other of said devices.

19. In a control system, apparatus to be controlled and two control mechanisms for independently controlling the operation of the apparatus to be controlled, one of said mechanisms being adapted to shift the control to or withdraw it from the other and to render the other inoperative.

20. In a control system, apparatus to be controlled, a control mechanism comprising a plurality of control devices and means for rendering one or another of said devices operative or inoperative in controlling said apparatus, and a master control mechanism for shifting the control to or withdrawing it from said first mentioned mechanism and for rendering the first mentioned mechanism operative or inoperative.

21. In a control system, apparatus to be controlled, two control mechanisms for independently controlling the apparatus to be controlled, one of said mechanisms being adapted to shift the control to the other mechanism and render itself inoperative in controlling the apparatus or to withdraw the control from the other apparatus and render it inoperative in controlling the apparatus.

22. In a control system, a plurality of engines to be controlled, and a plurality of control mechanisms therefor, each comprising devices for independently or conjointly controlling said engines, and one of said mechanisms being adapted to shift the control to or withdraw it from other mechanisms of the system.

23. In a control system, a plurality of engines to be controlled, a control mechanism comprising a plurality of devices for independently controlling the engines of the system, and means for shifting the control of all the engines to one or another of said devices, and a second mechanism comprising a plurality of devices for independently controlling the engines of the system and means for shifting the control of all the engines of the system to one of said devices and for shifting the control to or withdrawing it from said other mechanism.

24. In a control system, a plurality of engines to be controlled, a plurality of control devices, and means for imposing the control of a separate engine of the system on each device, and for shifting the control of all the engines of the system on to one device.

25. In a control system, two engines to be controlled, a separate valve actuating motor for each engine, a separate controlling valve for adjusting the degree of actuating fluid pressure delivered to each motor, and a distributing valve coöperating with both of said controlling valves for placing each controlling valve in communication with a separate motor, or for placing both the motors in communication with one of said controlling valves and for shutting off communication between the other controlling valve and both motors.

26. In a control system, two engines to be controlled, valve actuating motors for the engines, two controlling valves for adjusting the actuating fluid pressure delivered to each motor and for controlling the motors to drive the engines either ahead or astern, a distributing valve for delivering actuating fluid pressure to each controlling valve, for receiving back the pressure so delivered and for placing both controlling valves in communication with valve actuating motors or for closing communication between one or both controlling valves and said motors.

27. In a control system, two engines to be controlled, separate fluid actuated means for reversing each engine and for controlling the operation of the respective engine while operating ahead or reverse, a control device comprising two controlling valves each adapted to control the reversing operation of said means and the degree of fluid pressure delivered thereto, and a distributing valve for receiving the fluid pressure delivered from each of said controlling valves and for delivering it to one or both of said separate means, and a master control device for rendering said first mentioned control device effective or ineffective as a controlling agent of said means and comprising two controlling valves and a distributing valve for controlling the delivery of fluid to said valves and to said first mentioned device and the distribution of fluid from said valves and said device to said fluid actuated means.

28. In a control system, two turbines to be controlled, a separate ahead and an astern valve for each turbine, a separate fluid actuated motor for actuating each valve, a device for controlling the operation of said motors, comprising two controlling valves, each adapted to adjust the degree of fluid pressure delivered thereto, means for actuating said valves to deliver fluid to the ahead or astern valve-actuating motors, and a distributing device for receiving the actuating pressure delivered by said controlling valves and for placing one or the other of said controlling valves in communication with all the valve-actuating motors, or each controlling valve in communication with the valve actuating motors of a single engine.

In testimony whereof, I have hereunto subscribed my name this 18th day of May, 1914.

HERBERT T. HERR.

Witnesses:
C. W. McGHEE,
E. W. McCALLESTER.

Copies of this patent may be obtained for five cents each, by addressing the "Commissioner of Patents, Washington, D. C."